Dec. 12, 1967   J. R. HARNISH   3,357,198
AIR COOLING AND DEHUMIDIFICATION SYSTEMS
Filed June 20, 1966   2 Sheets-Sheet 1
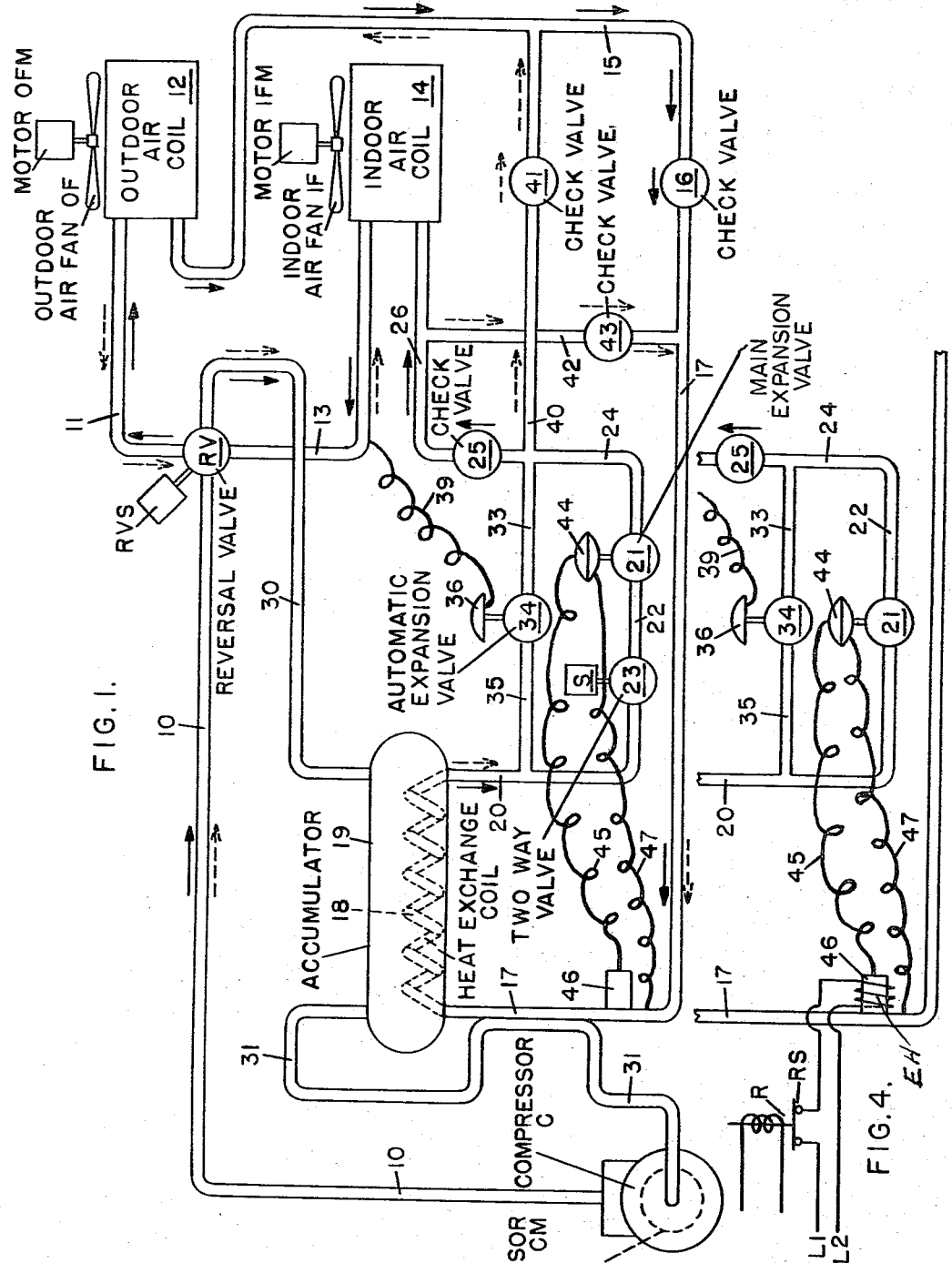
INVENTOR:
JAMES R. HARNISH,
BY Robert J. Palmer
ATTORNEY Dec. 12, 1967  J. R. HARNISH  3,357,198
AIR COOLING AND DEHUMIDIFICATION SYSTEMS
Filed June 20, 1966  2 Sheets-Sheet 2
FIG. 2a.
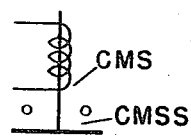
FIG. 2b.
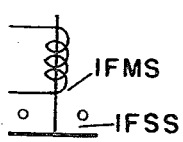
FIG. 2c.
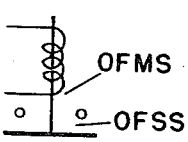
FIG. 2d.
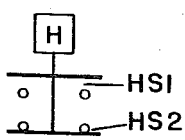
FIG. 2e.
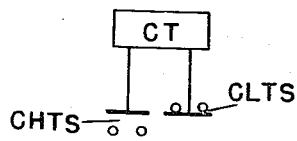
FIG. 2f.
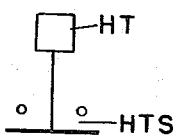
FIG. 2g.
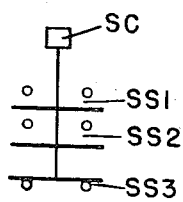
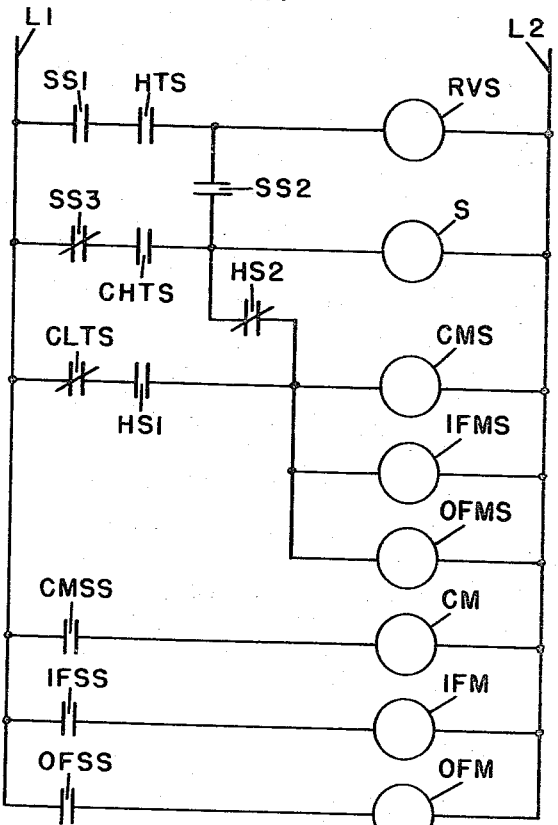
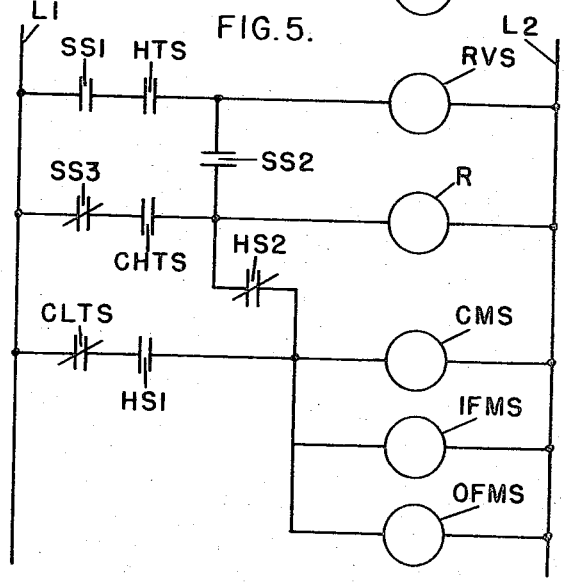
INVENTOR:
JAMES R. HARNISH,
BY Robert J. Palmer
ATTORNEY

United States Patent Office 3,357,198
Patented Dec. 12, 1967

3,357,198
AIR COOLING AND DEHUMIDIFICATION SYSTEMS
James R. Harnish, Staunton, Va., assignor to Westinghouse Electric Corporation, Pittsburgh, Pa., a corporation of Pennsylvania
Filed June 20, 1966, Ser. No. 558,735
14 Claims. (Cl. 62—173)

ABSTRACT OF THE DISCLOSURE

A refrigeration system has an evaporator coil used for air cooling, or for more than normal air dehumidification (more dehumidification than is provided during the air cooling). When air cooling is required, refrigerant flows through a main expansion valve into the evaporator coil. When more than normal dehumidification is required, flow through the main expansion valve is shut off. Refrigerant then flows through an automatic expansion valve connected across the main expansion valve, into the evaporator coil, the reduced pressure at the evaporator coil caused by the main expansion valve being shut off, causing the automatic expansion valve to open sufficiently to supply refrigerant into a portion of the evaporator coil at a lower temperature than when the main expansion valve was operating, so that moisture is condensed by that portion. The remaining portion of the evaporator coil is starved. The air passing over such remaining portion is heated, and mixes with the dehumidified air, reheating it.

---

This invention relates to air conditioning systems in which indoor air is chilled, at times, for dehumidification, to temperatures too low for comfort, and in which the dehumidified air is heated to increase its dry bulb temperature.

In many locations, the wet bulb temperature of the outdoor is frequently so high that when the utmost in comfort is desired, it is necessary to chill indoor air to a low dew point temperature in order to condense excess moisture. At times, even when the wet bulb temperature of the outdoor air is low, a high internal latent heat load, with respect to the sensible cooling load, may require moisture removal to maintain comfortable conditions while a minimum of sensible air cooling is required. When the indoor air has been so dehumidified, it is necessary to reheat it. Such reheating has been accomplished in the past by using a condenser coil as a reheat coil; by using an electric heater, or by mixing recirculated air with the chilled air in a so-called "by-pass" system.

A feature of this invention is that when more dehumidification of indoor air is required than is ordinarily provided by an air cooling evaporator coil, a portion of the evaporator coil is supplied with refrigerant to operate it at a temperature low enough to adequately dehumidify the air passing over its surface, while the remaining portion of the coil is starved so that the air passing over its surface is not chilled. The unchilled air mixes with the chilled air, increasing the sensible heat of the latter. A widely used system such as is disclosed in my copending application, Ser. No. 447,008, filed Apr. 9, 1965, now Patent No. 3,264,837, in which a subcooling control valve is used as an expansion valve, can be modified to use this invention merely preventing flow from the subcooling control valve, and permitting flow through an automatic expansion valve when dehumidification is required. The automatic expansion valve feeds a portion of the associated evaporator coil to operate that portion at a temperature much lower than when the sub-cooling control valve is in operation, with the remainder of the evaporator coil starved.

An advantage of a system embodying this invention over one using condenser reheat, is that a reheat coil is not required; the operating cost is lower, and where the system is a split system, it is not necessary to provide field connected piping. An advantage of a system embodying this invention over one using electric heat, is that electric heaters are not required, and the operating cost is much lower. An advantage of a system embodying this invention over a by-pass system, is that the ducts and dampers required by the latter are not used, and the operating cost is lower.

Among the objects of this invention are to decrease the capital and operating costs of systems in which air is chilled for dehumidification, and then reheated.

This invention will now be described with reference to the annexed drawings, of which:

FIG. 1 is a diagrammatic view of a heat pump embodying this invention;

FIGS. 2a, 2b, 2c, 2d, 2e, 2f and 2g are diagrammatic views of a compressor motor starter, an indoor fan motor starter, an outdoor fan motor starter, a humidistat, a cooling control thermostat, a heating control thermostat, and a cooling-heating selector control respectively, used with the heat pump of FIG. 1;

FIG. 3 is a simplified circuit schematic of the controls of the heat pump;

FIG. 4 is a diagrammatic view of a control for closing the subcooling control valve of FIG. 1, when the two-way valve shown by FIG. 1 is not used, and FIG. 5 shows how the circuit of FIG. 3 is modified when the control of FIG. 4 is used instead of the two-way valve and its solenoid.

Referring first to FIG. 1 of the drawings, a hermetic refrigerant compressor C, driven by an electric motor CM, is connected by discharge gas tube 10 to a refrigerant reversal valve RV, adjustable by a solenoid RVS to cooling or heating positions. The valve RV is connected by tube 11 to outdoor air coil 12, and by tube 13 to indoor air coil 14. The coil 12 is connected by tube 15 to check-valve 16 which is connected by tube 17 to heat exchange coil 18 within accumulator 19. The coil 18 is connected by tube 20 to the inlet of two-way valve 23, the outlet of which is connected by tube 22 to the inlet of main expansion valve 21. The outlet of the valve 21 is connected by tube 24 to check-valve 25 which is connected by tube 26 to the indoor coil 14. An automatic expansion valve 34 is connected by tube 33 to the tube 24, and by tube 35 to the tube 20, thus being connected across the series connection of the valves 23 and 21. The automatic expansion valve 34 has a diaphragm chamber 36 connected by equalizer tube 39 to the tube 13, although it could be internally equalized. The tube 24 is connected by tube 40 containing a check-valve 41 to the tube 15 between where the latter is connected to the outdoor coil 12 and to the check-valve 16. The tube 26 is connected by tube 42 containing a check-valve 43 to the tube 17 between where the latter is connected to the check-valve 16 and the coil 18. The reversal valve RV is connected by the tube 30 to the upper portion of the accumulator 19 at one end of the latter. A suction gas tube 31 connects the upper portion of the accumulator at the opposite end thereof to the suction side of the compressor C. Portions of the tubes 17 and 31 are in heat exchange contact.

The main expansion valve 21 is a subcooling control valve which supplies refrigerant liquid from the operating condenser coil to the operating evaporator coil at the rate at which the refrigerant is condensed, while maintaining a predetermined amount of subcooling of the condensed liquid, and is disclosed in detail in my previously mentioned application. It has a diaphragm chamber 44, the outer portion of which is connected by a capillary tube 45 to a thermal bulb 46 in heat exchange contact with the tube 17, and the inner portion of which is connected by a capillary equalizer tube 47 to the interior of the tube 17, although the valve 21 could be internally equalized when the resistance to refrigerant flow of the coil 18 is small. Thus, the valve 21 responds to the temperature and the pressure of the condensed refrigerant liquid.

The automatic expansion valve 34 is set to open at a pressure within the tube 13 when the coil 14 is operating as an evaporator coil, corresponding to an evaporating temperature substantially lower than normal, and to partially fill the coil 14 with refrigerant liquid.

An outdoor fan OF, driven by an electric motor OFM, moves outdoor air over the outdoor air coil 12. An indoor air fan IF, driven by an electric motor IFM, moves indoor air over the indoor air coil 14.

Referring now to FIGS. 2a–2g of the drawings, starter CMS of the compressor motor CM has a switch CMSS which closes when the starter CMS is energized; starter IFMS of the indoor fan motor IFM has a switch IFSS which closes when the starter IFMS is energized; starter OFMS of the outdoor fan motor OFM has a switch OFSS which closes when the starter OFMS is energized; humidistat H has a switch HS1 which is open, and a switch HS2 which is closed when the humidistat H is satisfied; cooling control thersostat CT has a switch CHTS which is open when the thermostat CT is satisfied, and has a normally closed switch CLTS which opens when there is a relatively low indoor temperature; heating control thermostat HT has a switch HTS which is open when the thermostat HT is satisfied, and cooling-heating selector control SC has switches SS1, SS2 and SS3. The switches SS1 and SS2 are open, and the switch SS3 is closed when the control SC is in its cooling position, and the switches SS1 and SS2 are closed, and the switch SS3 is open when the control SC is in its heating position.

Referring now to FIG. 3 of the drawings, the switches SS1 and HTS are connected in series with the solenoid RVS to electric supply lines L1 and L2; are connected in series with the switch SS2 and the solenoid S to the lines L1 and L2, and are connected in series with the switches SS2 and HS2, and the parallel-connected starters CMS, IFMS and OFMS to the lines L1 and L2. The switches CHTS and SS3 are connected in parallel with serially connected switches SS1, HTS and SS2. The switches CLTS and HS1 are connected in series with the parallel-connected starters CMS, IFMS and OFMS to the lines L1 and L2. The switch CMSS is connected in series with the compressor motor CM to the lines L1 and L2; the switch IFSS is connected in series with the fan motor IFM to the lines L1 and L2, and the switch OFSS is connected in series with the fan motor OFM to the lines L1 and L2.

When the solenoid RVS is energized, it places the reversal valve RV in its heating position, and when it is deenergized, it places the valve RV in its cooling position. The solenoid S is normally deenergized, and the valve 23 is normally closed. When the solenoid S is energized, it opens the valve 23. The heat pump is overcharged with refrigerant so that there is a quantity of refrigerant liquid within the accumulator 19 when there is flow through the valves 21 and 23.

Referring now to FIG. 4 of the drawings, FIG. 1 is modified to omit the two-way valve 23 and its solenoid S; to connect the automatic expansion valve 34 cross the subcooling control valve 21; to provide an electric heater EH wrapped around or embedded in the thermal bulb 46, and to provide a relay R having a normally closed switch RS connecting the heater EH to the supply lines L1 and L2.

Referring now to FIG. 5 of the drawings, FIG. 3 is modified to omit the solenoid S, and to substitute therefor the relay R.

*Cooling operation*

The solid-line arrows alongside the tubes of FIG. 1 show the direction of refrigerant flow during indoor air cooling operation. The selector control SC is in its cooling position with its switches S1 and S2 open, and its switch S3 closed. The solenoid RVS is deenergized by the open switch SS1 so that the reversal valve RV is in its cooling position. Assuming that the humidistat H is satisfied so that no dehumidification of the indoor air is required, its switch HS1 is open and prevents the humidistat H from controlling the compressor and fan motors. When the cooling control thermostat CT calls for cooling, it closes its switch CHTS which energizes through the closed switch SS3, the solenoid S which opens the valve 23, and energizes through the closed switches SS3 and HS2, the compressor and fan motor starters CMS, IFMS and OFMS. The latter close their switches CMSS, IFSS and OFSS respectively, starting the compressor, indoor and outdoor fan motors CM, IFM and OFM respectively.

Referring first to FIGS. 1–3 of the drawings, discharge gas flows from the compressor C through the tube 10, the reversal valve RV and the tube 11 into the outdoor coil 12 operating as a condenser coil. Liquid flows from the coil 12 through the tube 15, the check-valve 16, the tube 17, the coil 18 within the accumulator 19, the tube 20, the now open valve 23, the main expansion valve 21, the tube 24, the check-valve 25 and the tube 26 into the indoor coil 14 operating as an evaporator coil. The valve 21 overfeeds the coil 14, and gas and unevaporated refrigerant liquid flow from the latter through the tube 13, the reversal valve RV, and the tube 30 into the accumulator 19. Gas separated from the liquid within the accumulator 19 flows through the suction gas tube 31 to the suction side of the compressor C. The suction gas flowing through the tube 31 is superheated by heat from the high pressure liquid flowing through that portion of the tube 17 which is in contact with the tube 31, the high pressure liquid being subcooled by this action. Heat from the high pressure liquid flowing through the coil 18 evaporates the excess liquid flowing from the coil 14 into the accumulator 19, the high pressure liquid being further subcooled by this action.

When the thermostat CT satisfied, it opens its switch CHTS, deenergizing the solenoid S, and the compressor and fan motor starters, the latter deenergizing the compressor and fan motors.

If the humidity of the indoor air increases while the thermostat CT is satisfied, so that the humidistat H closes its switch HS1, and opens its switch HS2. The now open switch HS2 disconnects the thermostat switch CHTS from control of the motor starters. The now closed switch HS1 connects through the thermostat switch CLTS, the motor starters CMS, IFMS and OFMS to the line L1, starting the compressor and fan motors. The solenoid S is now deenergized by the now open switches CHTS and HS2, and closes the valve 23, preventing refrigerant from being supplied through the subcooling control valve 21 into the indoor coil 14. The latter becomes starved, and the pressure within the tube 13 decreases until the automatic expansion valve 34 opens, and supplies refrigerant from the tube 20 through the tube 35, the tube 33, the check-valve 25 and the tube 26 into the indoor coil 14 to operate a portion of the latter, for example 40% of the latter, at a lower temperature than the subcooling control valve 21 normally operates the indoor coil, the remaining 60% of the coil being starved. The air passing over the 40% portion of the coil 14 chills the air passing over it to a low dewpoint temperature so that moisture is condensed from such air. The unchilled air passing over the 60% portion of the coil 14 heats the chilled dehumidified air, increasing the sensible heat of the mixed air to that required for comfort.

By way of example, the temperature of the coil 14 during normal cooling operation would be about 40° F. to 45° F. The automatic expansion valve 34 is set to open when the pressure within the tube 13 decreases to that corresponding to a temperature of 28° F., the 40% portion of the coil 14 operating at that temperature.

When the humidistat H is satisfied, its switch HS1 opens, and its switch HS2 closes, restoring control of the compressor and fan motor starters to the thermostat CT.

The low temperature switch CLTS of the thermostat CT serves to deenergize the compressor and fan motor starters in case the humidistat H is set too low, or for other reasons, to prevent overchilling of the indoor air.

By increasing the amount of latent heat removal in relation to total heat removal, less operating time is required for maintaining a low relative humidity in the conditioned space. Since the compressor suction pressure is substantially reduced, the power input to the compressor for a given period of operating time is less.

For operation at 80° F. indoor dry bulb temperature and 67° F. indoor wet bulb temperature, the power required using this invention, to dehumidify, and to reheat the dehumidified air is about 50% of that required for an equivalent system in which all of the air passing over an operating evaporator coil is dehumidified, and in which condenser reheat is used, and is about 20% of that required for such an equivalent system in which electric reheat is used.

This invention can be used in a non-reversible system in which the operation is that described in the foregoing with the reversal and check-valves omitted.

*Heating operation*

The dashed-line arrows alongside the tubes of FIG. 1 show the direction of refrigerant flow during air heating operation. The selector control SC is adjusted to its heating position, closing its switches SS1 and SS2, and opening its switch SS3. The now open switch SS3 disconnects the thermostat switch CHTS from control of the solenoid S, of the compressor motor starter CMS, and of the fan motor starters IFMS and OFMS. The now closed switch SS1 places the switch HTS of the heating control thermostat HT in control of the reversal valve solenoid RVS, and the now closed switch SS2 places the switch HTS in control of the solenoid S and of the compressor and fan motor starters. The relative humidity of the indoor air would not increase during heating operation so that the humidistat H would be satisfied with its switch HS1 open and its switch HS2 closed. When the heating control thermostat HT calls for heat, its switch HTS closes, energizing through the now closed switch SS1 the reversal valve solenoid RVS which places the reversal RV in its heating position. The closed switch HTS also energizes through the now closed switches SS1 and SS2, the solenoid S which opens the valve 23. The now closed switch HTS energizes through the closed switches SS1, SS2 and HS2, the motor starters CMS, IFMS and OFMS which close their switches CMSS, IFSS and OFSS respectively, starting the motors CM, IFM and OFM respectively.

Discharge gas from the compressor C flows through the tube 10, the reversal valve RV and the tube 13 into the indoor coil 14 operating as a condenser coil. Liquid flows from the coil 14 through the tubes 26 and 42, the check-valve 43, the tube 17, the coil 18 within the accumulator 19, the now open valve 23, the subcooling control valve 21, the tubes 24 and 40, the check-valve 41 and the tube 15 into the outdoor coil 12 operating as an evaporator coil. Gas and unevaporated liquid flow from the coil 12 through the tube 11, the reversal valve RV and the tube 30 into the accumulator 19. Gas separated from the liquid within the accumulator 19 flows through the suction gas tube 31 to the suction side of the compressor C. The subcooling control valve 21, and the coil 18 operate as described in the foregoing in connection with cooling operation. When the thermostat HT is satisfied, its switch HTS opens and deenergizes the solenoid RVS which returns the reversal valve RV to its cooling position. The open switch HTS also deenergizes the motor starters which open their switches and deenergize the compressor and fan motors.

When the controls of FIGS. 4 and 5 are used, the two-way valve 23 and its solenoid S are omitted. The electric heater EH in contact with the thermal bulb 46, when energized, heats the bulb 46 causing an increased pressure within the latter which acting through the capillary tube 45 against the diaphragm within the diaphragm chamber 44 of the subcooling control valve 21, closes the latter. When the relay R is energized by the closing of the thermostat switch CHTS during cooling operation, or by the thermostat switch HTS during heating operation, it opens its switch RS denergizing the heater EH, following which the subcooling control valve 21 opens. When the humidistat H calls for dehumidification, it closes its switch HS1 and opens its switch HS2. The now open switch HS2 disconnects the thermostat switch CHTS from control of the motor starters CMS, IFMS and OFMS. The now closed switch HS1 connects through the thermostat switch CLTS, the motor starters CMS, IFMS and OFMS to the line L1, starting the compressor and fan motors. The relay R is now deenergized by the open switches CHTS and HS2, and closes its switch RS, energizing the heater EH which acts to close the expansion valve 21, following which the automatic expansion valve 34 opens and supplies refrigerant into the evaporator coil 14 to operate a portion of the latter at a reduced temperature, and to starve the remaining portion of the latter as in the case of FIGS. 1–3.

What is claimed is:

1. An air conditioning system comprising a refrigerant compressor; a condenser coil; a main expansion valve; an air cooling evaporator coil, and accumulator means connected in series in the order named in a refrigeration circuit; an automatic expansion valve connected to said condenser and evaporator coils; flow control means for permitting refrigerant to flow from said main expansion valve into said evaporator coil, and for preventing refrigerant from flowing from said main expansion valve into said evaporator coil, and means for causing said flow control means to permit refrigerant to flow from said main expansion valve into said evaporator coil when air cooling with normal air dehumidification is required from said evaporator coil, and for causing said flow control means to prevent refrigerant from flowing from said main expansion valve into said evaporator coil when more than normal air dehumidification is required from said evaporator coil.

2. An air conditioning system comprising a refrigerant compressor; a condenser coil; a main expansion valve; an air cooling evaporator coil, and accumulator means connected in series in the order named in a refrigeration circuit; an automatic expansion valve connected to said condenser and evaporator coils; flow control means for permitting refrigerant to flow from said main expansion valve into said evaporator coil, and for preventing refrigerant from flowing from said main expansion valve into said evaporator coil; means including air temperature responsive means for causing said flow control means to permit refrigerant to flow from said main expansion valve into said evaporator coil when air cooling with normal air dehumidification is required from said evaporator coil, and means including air humidity responsive means for causing said flow control means to prevent refrigerant from flowing from said main expansion valve into said evaporator coil when more than normal air dehumidification is required from said evaporator coil.

3. An air conditioning system as claimed in claim 2 in which said flow control means comprises a two-way valve in series with said main expansion valve between said condenser and evaporator coils, and which is opened to permit refrigerant to flow from said main expansion valve, and which is closed to prevent refrigerant from flowing from said main expansion valve.

4. An air conditioning system comprising a refrigerant compressor; a condenser coil; a heat exchange coil; a main expansion valve; and air cooling evaporator coil, and accumulator means connected in series in the order named in a refrigeration circuit, said heat exchange coil being arranged to heat liquid within said accumulator means; means for adjusting said expansion valve to supply refrigerant from said heat exchange coil into said evaporator coil at the rate at which refrigerant is condensed within said condenser coil; flow control means for permitting refrigerant to flow from said main expansion valve into said evaporator coil, and for preventing refrigerant from flowing from said main expansion valve into said evaporator coil; means for causing said flow control means to permit refrigerant to flow from said main expansion valve into said evaporator coil when air cooling with normal air dehumidification is required from said evaporator coil, and for causing said flow control means to prevent refrigerant from flowing from said main expansion valve into said evaporator coil when more than normal air dehumidification is required from said evaporator coil; and an automatic expansion valve connected to said heat exchange and evaporator coils.

5. An air conditioning system as claimed in claim 4 in which said main expansion valve is a subcooling control valve, and in which said means for adjusting said main expansion valve includes means responsive to the temperature and the pressure of the refrigerant flowing from said condenser coil.

6. An air conditioning system as claimed in claim 5 in which said means for causing said flow control means to permit and to prevent the flow of refrigerant from said main expansion valve includes, when permitting the flow of refrigerant from said main expansion valve, air temperature responsive means, and includes when preventing the flow of refrigerant from said main expansion valve, air humidity responsive means.

7. An air conditioning system as claimed in claim 4 in which said means for causing said flow control means to permit and to prevent the flow of refrigerant from said main expansion valve includes, when permitting the flow of refrigerant from said main expansion valve, air temperature responsive means, and includes, when preventing the flow of refrigerant from said main expansion valve, air humidity responsive means.

8. An air conditioning system as claimed in claim 7 in which said flow control means comprises a two-way valve in series with said main expansion valve between said heat exchange and evaporator coils, which is opened to permit the flow of refrigerant from said main expansion valve, and which is closed to prevent the flow of refrigerant from said main expansion valve.

9. An air conditioning system as claimed in claim 6 in which said flow control means comprises a two-way valve in series with said main expansion valve between said heat exchange and evaporator coils, which is opened to permit the flow of refrigerant from said main expansion valve, and which is closed to prevent the flow of refrigerant from said main expansion valve.

10. An air conditioning system as claimed in claim 4 in which said flow control means comprises a two-way valve in series with said main expansion valve between said heat exchange and evaporator coils, which is opened to permit the flow of refrigerant from said main expansion valve, and which is closed to prevent the flow of refrigerant from said main expansion valve.

11. An air conditioning system as claimed in claim 4 in which a liquid tube connects said condenser and heat exchange coils, in which said main expansion valve is a subcooling control valve, in which said means for adjusting said main expansion valve includes a thermal bulb in heat exchange contact with said liquid tube and which adjusts said main expansion valve towards closed position on an increase in the temperature of the liquid flowing through said liquid tube, in which a heater is provided for heating said thermal bulb sufficiently to cause said main expansion valve to close when said heater is activated, and in which means is provided for deactivating said heater when the flow of refrigerant from said main expansion valve is to be permitted, and for activating said heater when the flow of refrigerant from said main expansion valve is to be prevented.

12. An air conditioning system as claimed in claim 11 in which said means for deactivating said heater comprises air temperature responsive means, and in which said means for activating said heater comprises air humidity responsive means.

13. An air conditioning system as claimed in claim 12 in which said heater is an electric heater.

14. An air conditioning system as claimed in claim 11 in which said heater is an electric heater.

References Cited

UNITED STATES PATENTS 3,264,840  8/1966  Harnish _____ 62—173

WILLIAM J. WYE, *Primary Examiner.*